United States Patent [19]

Dunthorn

[11] Patent Number: 5,045,644
[45] Date of Patent: Sep. 3, 1991

[54] TOUCH SENSITIVE SCREEN WITH IMPROVED CORNER RESPONSE

[75] Inventor: David I. Dunthorn, Anderson County, Tenn.

[73] Assignee: Elographics, Inc., Oak Ridge, Tenn.

[21] Appl. No.: 509,601

[22] Filed: Apr. 16, 1990

[51] Int. Cl.$^5$ .............................................. G08C 21/00
[52] U.S. Cl. .......................................... 178/18; 382/13
[58] Field of Search ...................... 178/18, 19; 382/13, 382/59

[56] References Cited

U.S. PATENT DOCUMENTS

| | | | |
|---|---|---|---|
| 4,661,655 | 4/1987 | Gibson et al. | 178/18 |
| 4,731,508 | 3/1988 | Gibson et al. | 178/18 |
| 4,822,957 | 4/1989 | Talmage et al. | 178/18 |
| 4,853,493 | 8/1989 | Schlosser et al. | 178/18 |

*Primary Examiner*—Stafford D. Schreyer
*Attorney, Agent, or Firm*—Pitts & Brittian

[57] ABSTRACT

A resistor electrode type of gradient sheet for a touch sensor having reduced ripple and bow of equipotential lines along edges and in the corners of the sensor. Orthogonal electrical fields are produced on a resistive surface so as to give coordinates of a selected position. T-shaped electrodes of a selected effective length and spacing are attached to the resistive surface, the length and spacing selected to substantially eliminate the bow of the equipotential fields. Each electrode is connected to a selected connection point along a resistor chain positioned along each edge of the resistive surface to provide selected voltages to the surface. Preferably, each resistance chain is made up of at least one resistance unit between each electrode connection point, with each unit formed of a pair of spaced-apart conductive lines applied to the resistive surface. In addition, the gradient sheet has corner electrodes that are connected to corner junctions of the resistor chains, preferably through a resistor of a selected value. This results in a sensor having an increased linear work area as compared with the prior art.

11 Claims, 5 Drawing Sheets

TOUCH SENSITIVE SCREEN WITH IMPROVED CORNER RESPONSE

FIELD OF THE INVENTION

This invention relates generally to touch sensitive screens for producing output signals related to a touched position, and more particularly to an improved two-layered touch sensitive screen of the type having a gradient sheet and a sensing sheet, with the gradient sheet having improved corner response as compared to touch screens of the prior art.

BACKGROUND ART

One class of touch sensitive screens or sensors of the prior art utilizes two parallel conductive sheets which are held a short distance apart so that they do not normally make electrical contact. In operation a voltage is applied to one of the sheets so as to produce a "gradient" sheet, allowing current to flow therein. When the other sheet, referred to as a "sensing" sheet, is touched, it makes contact with the gradient sheet and so can be used to sample and measure the voltage on the gradient sheet at the point of contact. While these sheets can have different orientation, the gradient sheet is usually the bottom of the two sheets. The voltage thus produced is an analog of the position of the touch on the screen, and thus the position of the touch can be sensed. Typically a voltage is impressed in one direction across the gradient sheet during one short time interval with the touch voltage being measured. The voltage is then impressed in an orthogonal direction across the gradient sheet for another short time interval with the touch voltage again being measured. These two measurements completely define the position at which the screen has been touched. This alternation of direction of application of voltage to the gradient sheet occurs typically about 100 times per second thereby providing a substantially continuous stream of position information.

As is known by those skilled in the art, the required rapidly alternating voltage can be applied to the gradient sheet in several different ways. Most directly, a system of diodes can be placed at intervals along the edges of the gradient sheet and the voltage fed to the sheet through the diodes. These diodes also serve to block the flow of current in the wrong direction during alternating cycles.

As an alternate means, a resistor chain can be placed along the sides of the sheet with leads at intervals run onto the sheet to serve as feeder lines. Such a chain must serve a dual function. When a voltage is to be impressed in one direction, e.g., top to bottom in the sheet, the resistor chain across the top serves as a voltage feeder, with the same reference voltage applied at both ends of the chain and, similarly, the chain across the bottom is grounded at both ends. When this is occurring, the resistor chains down the sides of the sheet have the reference voltage at the top end and the ground voltage at the bottom; thus, the leads coming in from these side chains must be calibrated to be at the appropriate voltage for that position. These resistor chains, too, have been produced in several ways. In one, a resistive wire has been placed along each edge of the sheet as described in U.S. Pat. No. 4,661,655 issued to W. A. Gibson, et al on Apr. 28, 1987. With this construction, by running leads directly to the sheet at equal spacings along the wire, the needed voltages are produced. Other resistor chains, which function in a similar manner, are described in U.S. Pat. No. 4,731,508 issued to W. A. Gibson, et al on Mar. 15, 1988; and U.S. Pat. No. 4,822,957 issued to J. E. Talmage, Jr., et al on Apr. 18, 1989. The latter type of resistor chains are formed using an overlap conductor array on the conductive gradient sheet itself (the gradient sheet having some resistivity).

Because the resistor chains alternate functions when the voltages on the gradient sheet are switched (from top-to-bottom to across-the-sheet), it follows that the same resistor chains must also serve to feed the voltage to the sheet at the top and drain it at the bottom. Unaltered, this configuration does not produce an acceptable touch sensor because the current must flow through more of the resistor chain to get to the center of the sheet than it does to reach the corners; thus, the voltage at the center of the sheet will be lower than at the edge. This effect is called "bow" and, if the output voltage from the sensing sheet is to be used as a direct analog for distance (position), the bow effect must be eliminated or at least minimized. As taught in the above-cited U.S. Patents, all of which are assigned to the assignee of the present touch sensor, one method for substantially overcoming the bow is to vary the size of the contacts (electrodes) being fed via the leads from the resistor chain to the sheet. Typically, these contacts are "T" shaped (called tees hereinafter), with the top cross portion of the tee feeding voltage to the sheet. The wider the tee with respect to the width of the portion of the sheet to which it is feeding voltage, the lower the apparent resistance to current flow. Thus, by placing wider tees at the center of the sheet and narrower tees toward the corners, the total series resistance which the reference voltage encounters before reaching the active area of the sheet can be adjusted so that the bow is eliminated.

Unfortunately, it has been found that this method of bow elimination produces two adverse side effects. First, as the tees are necessarily made more narrow toward the corners of the sheet, a phenomenon called "ripple" is produced. The voltage contours tend to cup around the voltage source tee, and the cup is much more pronounced when there is a large open space between tees. A second variety of ripple is caused because, while the tees should match specific reference voltages along the side of the sheet, only the center of the tee can be at the correct reference voltage. Thus, constant voltage lines running across the sheet which are slightly above or slightly below the voltage of the tee must suddenly deviate so that ripple is also produced by tees which are too wide.

The second important side effect of the resistance chain and tee design comes from the consequence that a resistance chain feed element cannot be placed at the corner of the sheet active area. This means that the corner of the sheet, farther toward the corner than the last tee, is a "bad" area. This often requires that the first tee of the string must be placed very near the corner and must thus be quite narrow, which increases the undesirable ripple in the corner. Accordingly, the touch screens designed according to the above-described prior art lack accuracy in the corner areas.

Accordingly, it is an object of the present invention to provide a touch sensitive screen in which the bow of equipotential lines therein has been substantially eliminated and in which the ripple of the equipotential lines in corner areas of the screen have been substantially reduced so as to improve accuracy of response in these areas.

It is another object of the present invention to provide a touch sensitive screen having resistor chains along each edge, with leads to contacts on the surface of the screen connected to these resistor chains at selected points to produce selected voltages on the screen during operation thereof, with the contacts on the surface having selected spacing and effective length to compensate for any cumulative voltage drop along the resistor chains so as to substantially eliminate bow in equipotential lines in the screen, the screen further having a contact of a selected length in each corner, the corner contact not being a part of the resistor chain but a part which operates electrically in parallel with the resistor chains.

These and other objects of the present invention will become more apparent upon a consideration of the drawings referred to hereinafter when taken together with a full disclosure of the invention.

SUMMARY OF THE INVENTION

In accordance with the present invention, there is provided a touch sensitive screen of the type having a gradient sheet closely spaced from a sensing sheet, with the screen exhibiting substantial absence of bow and ripple so as to provide an active area of maximum size for a given screen. The gradient sheet has a resistor chain along each edge, with selected positions along these chains connected to T-shaped contacts on the sheet. The spacing and length of each tee is chosen to compensate for any cumulative voltage drop along the resistor chain perpendicular to current flow through the sensor sheet during operation when orthogonal fields are applied to the sheet. This construction substantially eliminates bow in equipotential lines in the sheet. In addition, an element is added at each corner of the sheet, in line with the tee contacts, for applying voltage at the corners. This element is not part of the resistor chain, but operates electrically in parallel with those chains. The corner element, or "dart" is of the same nature as the tees, but it is connected, preferably via a resistor, to the same voltage source as the resistor chain.

DETAILED DESCRIPTION OF THE INVENTION

Figure 1:
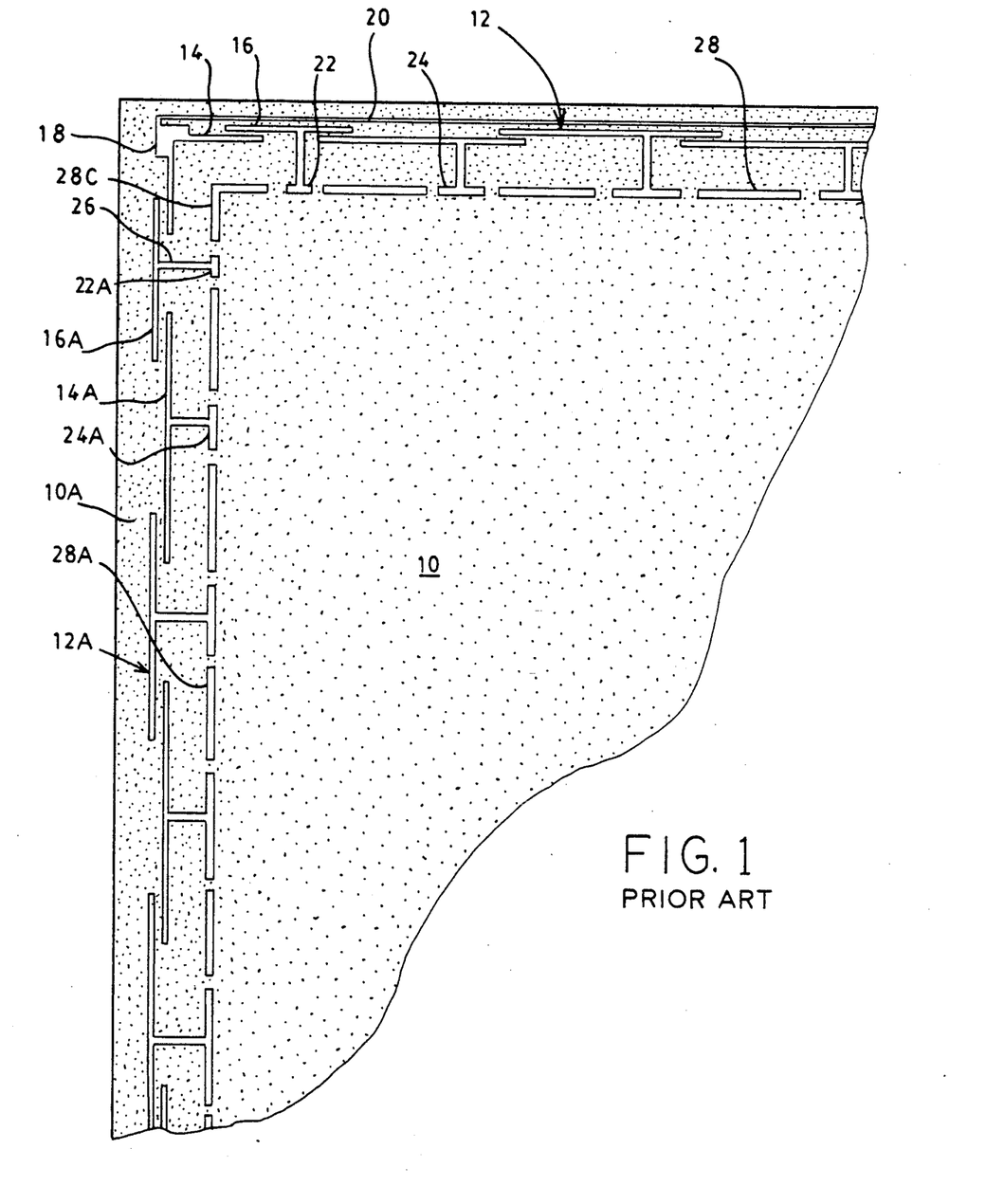
FIG. 1 is a drawing, partially cut away, showing a corner of a touch sensitive screen of the prior art (such as in the aforementioned U.S. Patents).

In order to better understand the present invention, a brief description is given of a typical prior art gradient sheet of touch sensitive screen. This description is directed to the construction shown and described in the afore-cited U.S. Pat. No. 4,822,957, the contents of which are incorporated herein by reference. Referring to FIG. 1, which shows just a corner portion of the gradient sheet with the components slightly enlarged for clarity, the gradient sheet has a central uniform resistive surface or layer 10 of, for example, two hundred ohms per square. In some touch screens, the resistivity of the edge of the gradient sheet has a different value than in the center to facilitate, for example, the creation of the appropriate resistor chain. These variations will be known by persons skilled in the art such that it is appropriate to state that the resistive surface has a "selected" resistivity. This resistive surface can be on a suitable substrate which is either transparent or opaque depending upon the particular utilization of the touch sensor.

Positioned along each edge of the surface is a resistor chain as indicated at 12, 12A which, in this case, is made up of a series of overlapping conductive strips 14, 16, 14A and 16A. Using these conductive strips and the resistivity of the surface 10, the specific resistance of the resistor chains can be tailored for the particular application and distribution of voltages along the edges of the gradient sheet. It will be understood that other types of resistor chains, such as taught in the aforementioned patents can be utilized. A conductive corner tab 18 is used to apply a voltage to the end of the resistor chains 12, 12A, and a conductive lead 20 typically connects this tab to a tab (not shown) at another corner of the sheet. It will be understood, however, that this connection between corner tabs can be made external to the gradient sheet.

Spaced along the edges of the layer 10 are a plurality of T-shaped electrodes, or "tees" 22, 22A, 24, 24A, etc. These are connected to the resistor chains 12, 12A with conductive leads typically illustrated at 26. The position of these leads along the resistor chains is selected to provide the appropriate reference voltage to the tee. As described in this cited patent, the length and spacing of the tees are chosen to compensate for any cumulative voltage drop along the resistor chain perpendicular to current flow in the resistive surface. In addition, in a preferred embodiment of this prior art sensing sheet, there are elongated regions 28, 28A, 28C of high resistance (produced by, for example, no deposit of resistive material on the sheet 10), substantially aligned with, and interspersed between, the tees. This substantially isolates the main portion of the resistive surface 10 from that portion 10A in the region of the resistor chains 12, 12A. The operation of this sensor gradient sheet has been described fully in the above-cited U.S. Pat. No. 4,822,957.

Figures 2, 6:
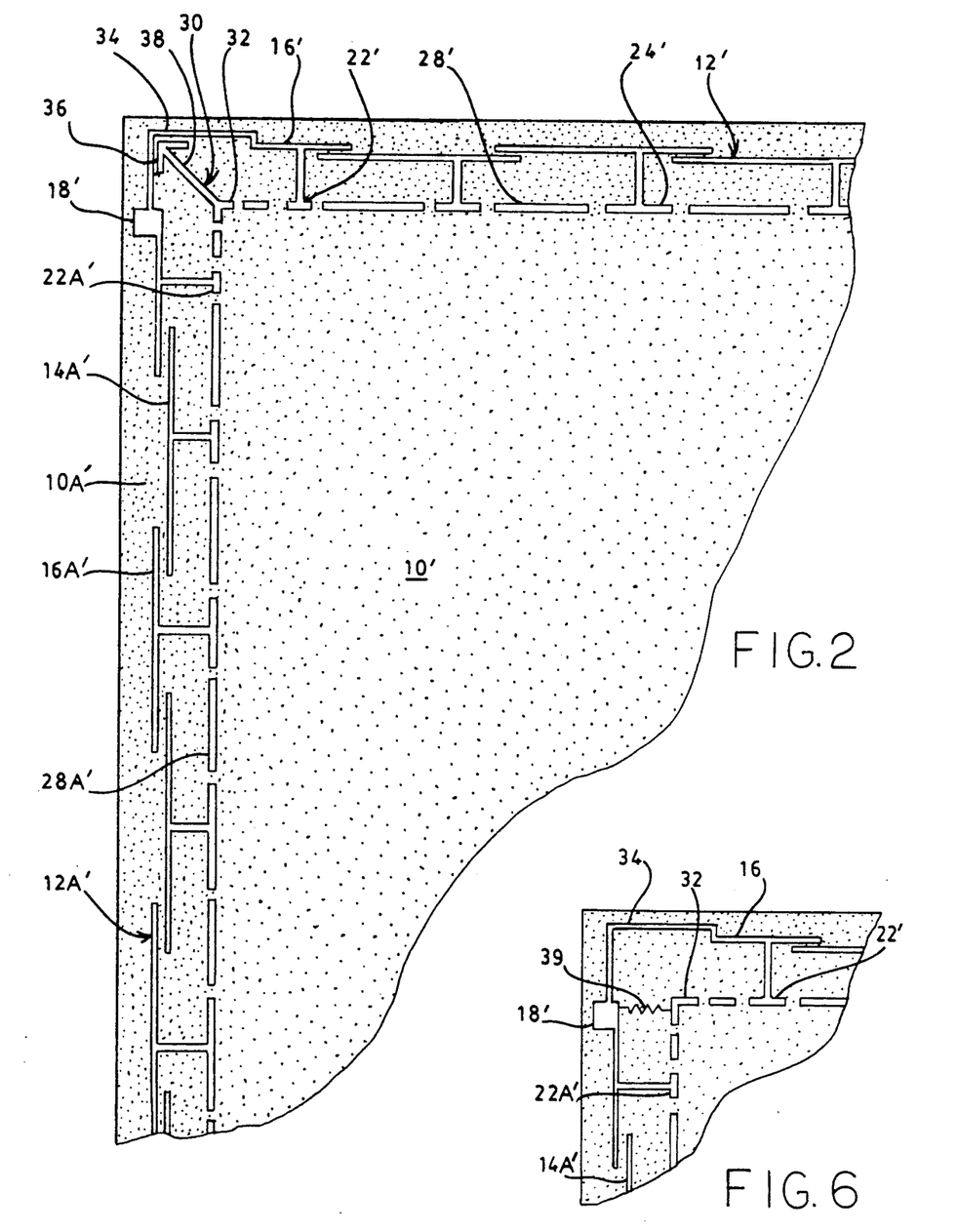
FIG. 2 is a drawing, partially cut away, showing a corner of a touch sensitive screen of one embodiment of the present invention.
FIG. 6 is a partially cut-away drawing of a touch sensitive screen showing still another embodiment of the present invention.

A corresponding drawing of one embodiment of the present invention is illustrated in FIG. 2. All components that serve functions like those of FIG. 1 carry the same number but with a prime (e.g., the resistive surface is designated 10'). The change of construction occurs in the corners of the gradient sheet (all corners are substantially the same) where a "dart" 30 is inserted to substantially overcome the ripple of equipotential lines in the corner portions. This dart has a corner conductive contact or electrode 32 that is aligned with the intersecting paths that contain the tees 22', 22A', 24', 24A', etc., as shown. In the embodiment illustrated, an appropriate resistance for this dart is provided by the overlapping conductive strips 34, 36, with this resistance creating an appropriate voltage for the corner electrode that is fed thereto by lead 38. With this construction, the dart is electrically in parallel with the resistor chains 12', 12A' without being a part of these chains. It will be understood that other resistor means can be used to provide the appropriate voltage for the corner electrode from the tap 18'. One such alternative, which is shown in FIG. 6, is through the use of an independent resistor 39 rather than the overlap resistor shown. This drawing does not show any connection between voltage source tab 18' and tabs at other corners. These connections can be provided on the gradient sheet (as in FIG. 1) or can be external to the sheet.

It has been found that darts 30 as described introduce a satisfactory correction in the voltage readings near screen corners. Further, it has been determined by numerical modelling that the induced correction is quite insensitive to the precise geometry of the dart. The self-correcting mechanism seems to result from the physics and geometry of the construction. In fact, providing the tee portion of the dart is kept small, some applications of sensor screens using the dart permit direct connection of the dart to the corner source voltage tab 18' such that the resistor value of the connection becomes essentially zero. Furthermore, the performance of the sensor is quite insensitive to the value of this resistor, such that the value can be varied over a wide range of values (4:1 or more). Thus, it is the presence of the dart and not the size and shape of the dart that is critical to the satisfactory operation of the sensor. Of further significance, and as shown FIG. 2 compared to FIG. 1, the regular tees 22', 22A' (for application of the voltages to the surface) closest to the corners can be moved farther from the corners. These can then be made longer to further reduce edge ripple.

Figure 3A:
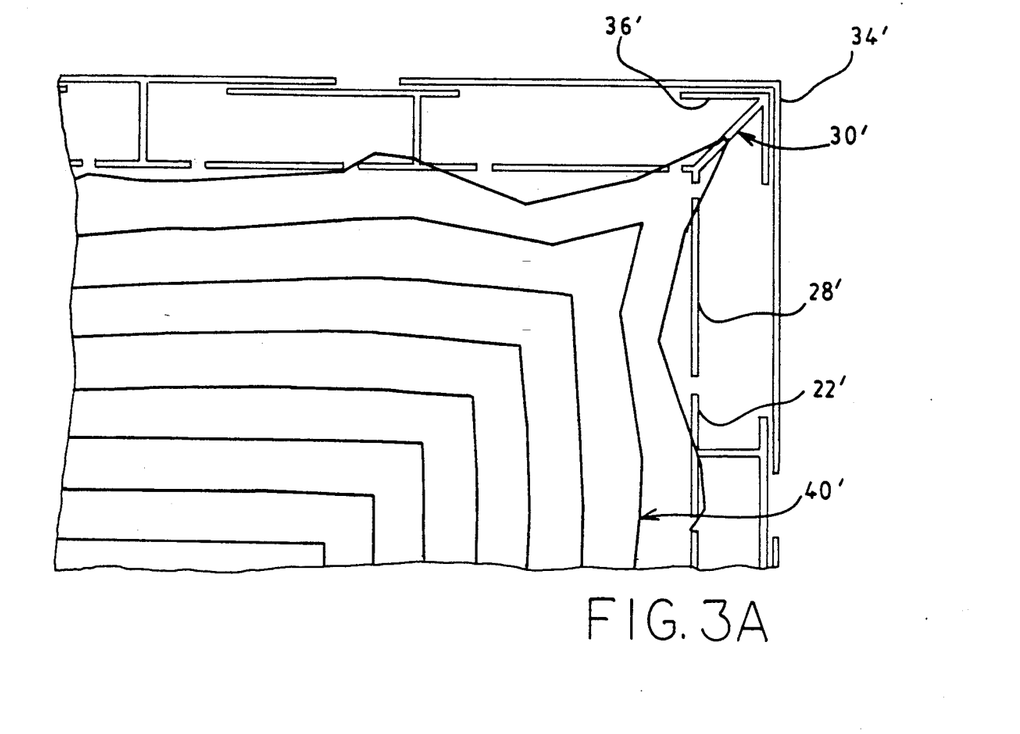
FIG. 3A is a partially cut-away drawing of a corner of a touch, sensitive gradient sheet showing another embodiment of the present invention.
Figure 3B:
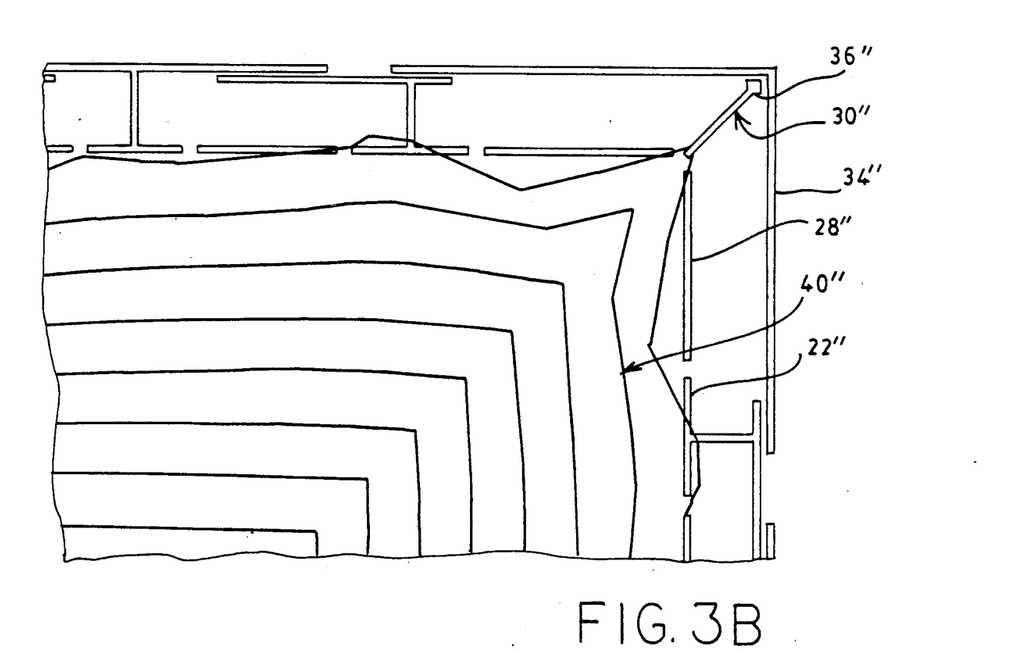
FIG. 3B is similar to that of FIG. 3A except another embodiment of the present invention is illustrated.

Various configurations of the dart element 30', 30" are shown in FIGS. 3A, and 3B, respectively. FIG. 3A, for example, illustrates the dart 30' with a higher series resistance. Then in FIG. 3B there is shown a dart 30" with a small tee and a low resistance. Depending upon the application for the sensor and the response that is desired, the dart can have any of the range in combinations of tee size and resistor size. Drawn on these FIGS. 3A and 3B are "ruler line plots" 40' which are discussed below.

Figure 4A:
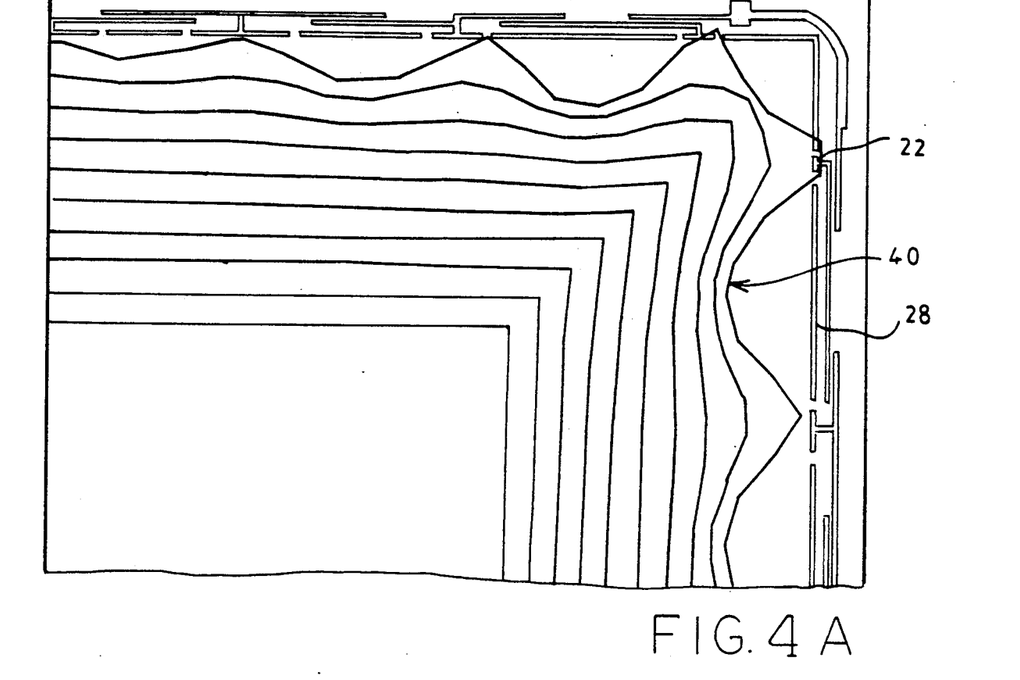
FIG. 4A is a drawing illustrating a "ruler line plot" as obtained using the prior art gradient sheet of FIG. 1.
Figure 4B:
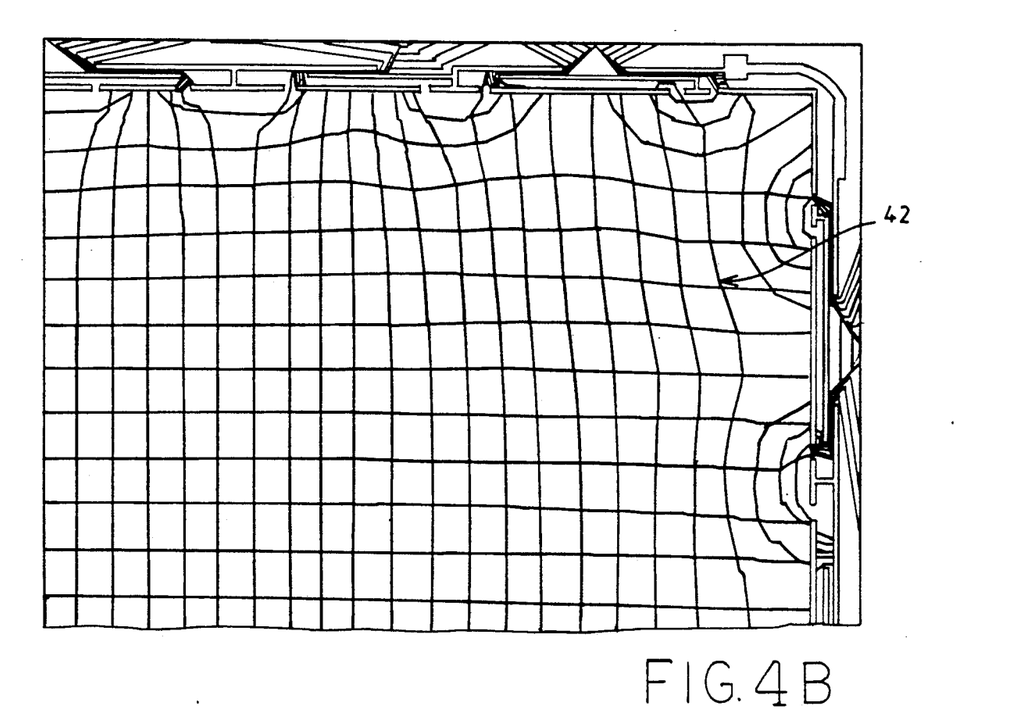
FIG. 4B is a drawing illustrating the equipotential lines as obtained using the prior art gradient sheet of FIG. 1.

The performance of any touch sensitive screen can be demonstrated with what is known as a "ruler line plot", which is what a rectangular set of lines would look like if impressed upon the sensor, and an equipotential line plot showing the location of equal potentials on the sensor. For example, FIGS. 4A and 4B are, respectively, a ruler line plot 40 and an equipotential line plot 42 that are typical of the prior art construction of FIG. 1. These lines, typically, represent each 0.1 volt difference. It can be seen that there is substantial ripple along the edges of the sensor, and particularly in regions near the corner. Accordingly, it can be seen that the ruler line plot only has straight lines a significant distance in from the edges. This area of straight lines defines the linear portion of the work area of the sensor.

Figure 5A:
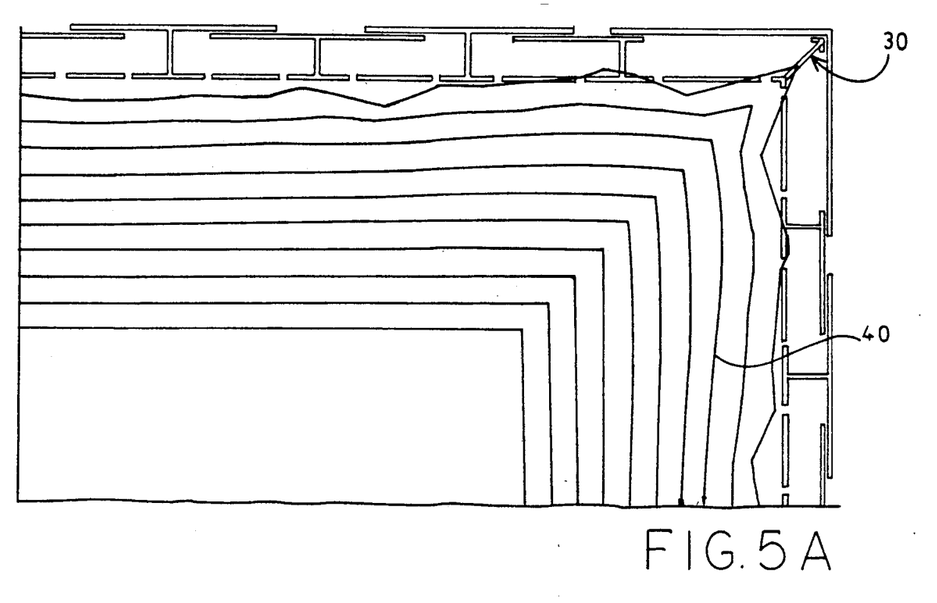
FIG. 5A is a drawing illustrating a ruler line plot as obtained using the embodiment of the present invention shown in FIG. 2.
Figure 5B:
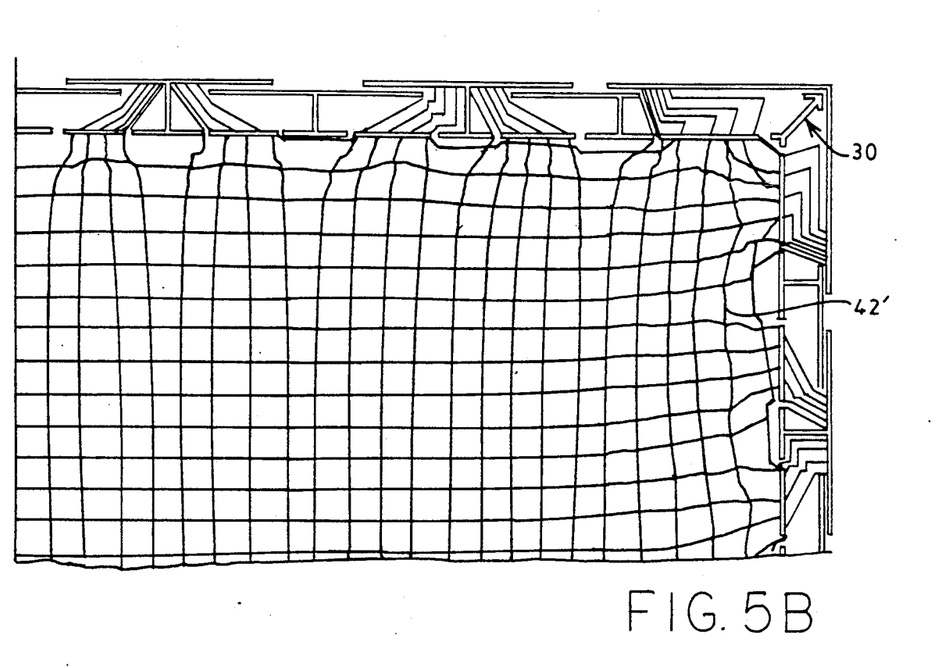
FIG. 5B is a drawing illustrating the equipotential line plot as obtained using the embodiment of the present invention shown in FIG. 2.

A contrast can be seen by reference to FIGS. 5A and 5B as obtained using a corner dart on the sensor. An appreciably larger proportion of the sensor has linear response due to the reduction of the edge and corner ripple. Similar plots are obtained when the resistance feeding the dart (due to the overlap illustrated) is either increased or reduced from the value obtained by the sizes illustrated in FIGS. 4A and 4B. These plots illustrate that, for many cases, there is very little effect upon the performance of the sensor over a range of about 4:1.

Similarly, plots obtained when the resistance is reduced to substantially zero show improvement over sensors where no dart is utilized. In most applications, however, some resistance is preferred. Also, if the dart unit is isolated from the main portion of the gradient sheet, as by a continuation of the isolation regions (regions 28, 28A of FIG. 2), some benefit in performance is achieved; however, this benefit is less than that obtained using the construction of FIG. 2 (or FIGS. 3A, 3B, 5A, 5B).

From the foregoing it will be understood by persons skilled in the art that a gradient sheet for a touch sensitive sensor has been provided that has improved operating characteristics as compared to the corresponding type of gradient sheet of the prior art. While this improved gradient sheet has been developed for use with a conventional sensing sheet, it can be used in other applications of touch sensors where various signal "pick-off" devices are utilized.

Although certain details are given herein for illustration, they are not given as a limitation of the present invention. Rather, the present invention is to be limited only by the appended claims and their equivalents when taken together with the complete description.

I claim:

1. A position touch sensor having resistive electrodes which provides a linear output response over an enhanced proportion of the surface area of said sensor by reducing the ripple and bow or equipotential lines along edges of said sensor and reducing ripple or equipotential lines in corner areas, which comprises:

a resistive surface having a selected resistivity throughout said surface, said resistive surface defining perimeter edges and corners;

a resistor chain positioned proximate each of said perimeter edges of said resistive surface for providing orthogonal electrical fields on said resistive surface, each of said resistor chains having opposite ends joined at junction points proximate said corners to proximate ends of adjoining resistor chains;

a plurality of edge tee electrodes positioned on, and electrically connected to, said resistive surface along a path proximate each perimeter edge of said surface, said edge tee electrodes each being electrically connected to selected points along said resistor chains and having a selected spacing and an effective length along said path, said length and spacing selected to produce a selected voltage gradient at each of said edge tee electrodes to compensate for any cumulative voltage drop along said resistor chain perpendicular to current flow in said resistive surface to thereby reduce bow in said equipotential lines at said edges; and a corner electrode positioned so as to be at an intersection of adjacent of said paths of said edge tee electrodes proximate each corner of said resistive surface, and electrically connected to said resistive surface, said corner electrode connected by an electrical connection to an adjacent of said junctions joining said resistor chains so as to be electrically in parallel with said resistor chains and produce a selected voltage at said corner electrode, said corner electrode provided for the reduction of ripple of equipotential lines in said resistive surface along said edges and at said corners.

2. The sensor of claim 1 wherein said electrical connection connecting said corner electrode to said adjacent junction includes a series resistance of a selected value whereby said corner electrode and series resistance are electrically in parallel with said resistor chains and edge tee electrodes.

3. The sensor of claim 2 wherein said series resistance in said electrical connection connecting said corner electrode to said junction is an independent resistor.

4. The sensor of claim 2 wherein said series resistance in said electrical connection connecting said corner electrode to said junction is an overlap resistor comprising a pair of lines of conductive material in electrical contact with said resistive surface and spaced apart a selected distance and overlapping a selected length to provide said selected value of resistance.

5. The sensor of claim 4 wherein said selected value of resistance is established by said resistivity of said resistive surface at said pair of lines of conductive material and by said selected separation distance and said overlap length of said pair of lines of conductive material.

6. The sensor of claim 1 wherein each of said resistor chains has at least one resistance unit interposed between adjacent selected connection points for said edge tee electrodes, each said resistance unit formed by a pair of lines of conductive material being in electrical contact with said resistive surface and spaced apart a selected distance and overlapping a selected length whereby said resistance unit has a resistance value established by said resistivity of said resistive surface and by said selected separation distance and said overlap length.

7. A position touch sensor having resistive electrodes which provides a linear output response over an enhanced proportion of the surface area of said sensor by reducing the ripple and bow of equipotential lines along edges of said sensor and reducing ripple of equipotential lines in corner areas, which comprises:

a resistive surface having a selected resistivity throughout said surface, said resistive surface defining perimeter edges and corners;

a resistor cain positioned proximate each of said perimeter edges of said resistive surface for producing orthogonal electrical fields on said resistive surface, each of said resistor chains having opposite ends joined at junction points proximate said corners to proximate ends of adjoining resistor chains;

a plurality of tee electrodes positioned on, and electrically connected to, said resistive surface along a path proximate each perimeter edge of said surface, said tee electrodes each being electrically connected to selected points along said resistor chains and having a selected spacing and an effective length along said path, said length and spacing selected to produce a selected voltage gradient at each of said tee electrodes to compensate for any cumulative voltage drop along said resistor chain perpendicular to current flow in said resistive surface to thereby reduce bow in said equipotential lines at said edges; and a corner electrode positioned so as to be at an intersection of adjacent of said paths of said edge tee electrodes proximate each corner of said resistive surface, and electrically connected to said resistive surface, said corner electrode connected by a resistor of a selected resistance value to an adjacent of said junctions joining said resistor chains so as to be electrically in parallel with said resistor chains and to provide a selected voltage on said corner electrode, said corner electrode providing for the reduction of ripple of equipotential lines in said restrictive surface along said edges and at said corners.

8. The sensor of claim 7 wherein said resistor connecting said corner electrode to said junction is an overlap resistor comprising a pair of lines of conductive material in electrical contact with said resistive surface and spaced apart a selected distance and overlapping a selected length to provide said selected value of resistance.

9. The sensor of claim 8 wherein said selected value of resistance is established by said resistivity of said resistive surface and by said selected separation distance and said overlap length of said pair of lines of conductive material.

10. The sensor of claim 7 wherein each of said resistor chains has at least one resistance unit interposed between adjacent selected connection points for said edge tee electrodes, each said resistance unit formed by a pair of lines of conductive material being in electrical contact with said resistive surface and spaced apart a selected distance and overlapping a selected length whereby said resistance unit has a resistance value established by said resistivity of said resistive surface and by said selected separation distance and said overlap length.

11. A position touch sensor having resistive electrodes which provides a linear output response over an enhanced proportion of the surface area of said sensor by reducing the ripple and bow of equipotential lines along edges of said sensor and reducing ripple of equipotential lines in corner areas, which comprises:

a resistive surface having a selected resistivity throughout said surface, said resistive surface defining perimeter edges and corners;

a resistor chain positioned proximate each of said perimeter edges of said resistive surface for producing orthogonal electrical fields on said resistive surface, each of said resistor chains having opposite ends joined at junction points proximate said corners to proximate ends of adjoining resistor chains, each of said resistor chains having at least one resistance unit interposed between adjacent selected connection points, each said resistance unit formed by a pair of lines of conductive material being in electrical contact with said resistive surface and spaced apart a selected distance and overlapping a selected length whereby said resistance unit has a resistance value established by said resistivity of said resistive surface and by said selected separation and said overlap length;

a plurality of tee electrodes positioned on, and electrically connected to, said resistive surface along a path proximate each perimeter edge of said surface, said tee electrodes each being electrically connected to selected points along said resistor chains and having a selected spacing and an effective length along said path, said length and spacing selected to produce a selected voltage gradient at each of said tee electrodes to compensate for any cumulative voltage drop along said resistor chain perpendicular to current flow in said resistive surface to thereby reduce bow in said equipotential lines at said edges; and a corner electrode positioned so as to be at an intersection of adjacent of said paths of said edge tee electrodes proximate each corner of said resistive surface, and electrically connected to said resistive surface, said corner electrode connected by a series resistor of a selected resistance value to an adjacent of said junctions joining said resistor chains so as to be electrically in parallel with said resistor chains and to provide a selected voltage on said corner electrode, said corner electrode and said series resistor providing for the reduction of ripple of equipotential lines in said resistive surface along said edges and at said corners.

* * * * *